US 12,098,945 B2

(12) United States Patent
Song et al.

(10) Patent No.: US 12,098,945 B2
(45) Date of Patent: Sep. 24, 2024

(54) REAL-TIME VEHICLE OVERLOAD DETECTION METHOD BASED ON CONVOLUTIONAL NEURAL NETWORK

(71) Applicants: Dibi (Chongqing) Intelligent Technology Research Institute Co., Ltd., Chongqing (CN); Star Institute of Intelligent Systems, Chongqing (CN)

(72) Inventors: Yongduan Song, Chongqing (CN); Yujuan Wang, Chongqing (CN); Gonglin Lu, Chongqing (CN); Shilei Tan, Chongqing (CN); Yating Yang, Chongqing (CN); Chunxu Ren, Chongqing (CN); Mingyang Liu, Chongqing (CN)

(73) Assignees: Dibi (Chongqing) Intelligent Technology Research Institute Co., Ltd, Chongqing (CN); Star Institute of Intelligent Systems, Chongqing (CN)

( * ) Notice: Subject to any disclaimer, the term of this patent is extended or adjusted under 35 U.S.C. 154(b) by 395 days.

(21) Appl. No.: 17/491,216

(22) Filed: Sep. 30, 2021

(65) Prior Publication Data
US 2022/0196459 A1    Jun. 23, 2022

(30) Foreign Application Priority Data
Dec. 22, 2020  (CN) .......................... 202011526778.8

(51) Int. Cl.
*G01G 19/02*   (2006.01)
*G06N 3/04*    (2023.01)
*G06N 3/082*   (2023.01)

(52) U.S. Cl.
CPC ............. *G01G 19/024* (2013.01); *G06N 3/04* (2013.01); *G06N 3/082* (2013.01)

(58) Field of Classification Search
CPC ........ G01G 19/024; G06N 3/04; G06N 3/082; G06N 3/045; G06N 3/08; G06F 18/241;
(Continued)

(56) References Cited

U.S. PATENT DOCUMENTS 9,760,806 B1 * 9/2017 Ning ...................... G06V 20/56
10,853,671 B2 * 12/2020 Mansour ................ G06N 3/045
(Continued)

*Primary Examiner* — Jacques M Saint Surin
(74) *Attorney, Agent, or Firm* — Jason T. Daniel, Esq.; Daniel Law Offices, P.A.

(57) ABSTRACT

The present disclosure provides a real-time vehicle overload detection method based on a convolutional neural network (CNN). The present disclosure detects a road driving vehicle in real time with a CNN method and a you only look once (YOLO)-V3 detection algorithm, detects the number of wheels to obtain the number of axles, detects a relative wheelbase, compares the number of axles and the relative wheelbase with a national vehicle load standard to obtain a maximum load of the vehicle, and compares the maximum load with an actual load measured by a piezoelectric sensor under the vehicle, thereby implementing real-time vehicle overload detection. The present disclosure has desirable real-time detection, can implement no-parking vehicle overload detection on the road, and avoids potential traffic congestions and road traffic accidents.

6 Claims, 5 Drawing Sheets

(58) Field of Classification Search
CPC .. G06F 18/23213; G06V 20/54; G06V 10/44;
G06V 2201/08
USPC ........................................................ 177/136
See application file for complete search history.

(56) References Cited

U.S. PATENT DOCUMENTS

| | | | |
|---|---|---|---|
| 11,010,641 B2 * | 5/2021 | Buslaev | G06V 20/20 |
| 11,254,331 B2 * | 2/2022 | Ryu | G06V 10/764 |
| 11,495,012 B1 * | 11/2022 | Hwang | G06V 20/56 |
| 11,500,063 B2 * | 11/2022 | Beijbom | G06N 3/045 |
| 11,847,834 B2 * | 12/2023 | Gil | G06V 10/84 |

* cited by examiner

REAL-TIME VEHICLE OVERLOAD DETECTION METHOD BASED ON CONVOLUTIONAL NEURAL NETWORK

CROSS REFERENCE TO RELATED APPLICATION

This patent application claims the benefit and priority of Chinese Patent Application No. 202011526778.8, filed on Dec. 22, 2020, the disclosure of which is incorporated by reference herein in its entirety as part of the present application.

TECHNICAL FIELD

The present disclosure relates to an object detection technology, and in particular, to a no-parking truck overload detection method based on a convolutional neural network (CNN).

BACKGROUND ART

In road transportation, the overloading of trucks not only affects the safety of roads and bridges, but also poses great threat to people's lives in public. With loads higher than state-specified loads supported by the roads and bridges, the overloaded vehicles accelerate the loss of roads and bridges to cause massive maintenance funds, and often lead to traffic accidents. As the overloaded vehicles carry loads far greater than design loads of the roads and bridges, the roads where the vehicles are driven frequently are prone to pavement damage and bridge rupture, thereby greatly shortening the normal service life of the roads.

Presently, the overloading of vehicles is mainly avoided by pasting weight limit signs and arranging law enforcement officers for manual patrol and inspection. The law enforcement officers observe driving vehicles and guide trucks suspected to be overloaded to the check point for actual measurement. Such a manual detection method has the following defects: (1) The officers cannot work for 24 h; (2) on the basis of subjective judgments of the law enforcement officers, the precision cannot be ensured; and (3) the efficiency is low, and the vehicle-parking detection is time-consuming to cause traffic congestions easily.

In view of the above defects of the manual overload detection, the present disclosure investigates a CNN-based object detection algorithm, and constructs a truck overload detection network with you only look once (YOLO)-V3, to implement automatic real-time vehicle overload detection without parking.

SUMMARY

The present disclosure detects a road driving vehicle in real time with a CNN method and a YOLO-V3 detection algorithm, detects the number of wheels to obtain the number of axles, detects a relative wheelbase, compares the number of axles and the relative wheelbase with a national vehicle load standard to obtain a maximum load of the vehicle, and compares the maximum load with an actual load measured by a piezoelectric sensor under the vehicle, thereby implementing real-time vehicle overload detection. The flow chart of the detection algorithm is as shown in FIG. 1.

The present disclosure uses the following technical solutions.

A real-time vehicle overload detection method based on a CNN constructs, based on YOLO-V3, an object detection network for detecting a tire of a vehicle, performs sparsification on a YOLO network based on L1 regularization by using an artificial neural network pruning algorithm, and performs channel pruning on a CNN, thereby compressing the network greatly at a small precision loss; and the real-time vehicle overload detection method includes the following steps:

step 1: preparing a visual object classes (VOC) dataset;

acquiring an image of a multi-axle vehicle on site, labeling the acquired image (including the number of axles of the vehicle such as 6-axle and a wheel on a single side of the vehicle) of the multi-axle vehicle with a labeling tool, and preparing the VOC dataset, where the VOC dataset includes four parts, specifically, a folder Annotations stores a label file suffixed by an xml for all images, a folder JPEGImages stores all dataset images, a folder ImageSets stores a file suffixed by a txt and generated after the dataset is partitioned, and a folder labels stores a file converted from the label file and suffixed by the txt;

step 2: configuring a training environment for a YOLO-V3 object detection network model;

constructing the YOLO-V3 object detection network model with a darknet deep learning framework in a ubuntu system, and training the YOLO-V3 object detection network model on the darknet deep learning framework, where the YOLO-V3 object detection network model is trained and tested on a computer;

step 3: training the YOLO-V3 object detection network model;

training the model with a YOLO-V3 object detection algorithm, and simplifying the network model with a pruning algorithm, thereby reducing a performance requirement on the computer in an actual application scenario;

step 3.1: pre-training the YOLO-V3 object detection network model with Darknet53, and training the model with the VOC-format dataset prepared in step 1, where as shown in FIG. 3, the Darknet53 is mainly composed of a series of 1×1 and 3×3 convolutional layers, with a total of 53 layers, and each convolutional layer is followed by a batch normalization (BN) layer and LeakyReLU layer;

step 3.2: sparsely training the network model, performing channel pruning on the network according to a proportion or a set threshold, and performing iterative pruning according to a precision of a pruned network until a detection precision meets a requirement; and step 3.3: selecting a pruning channel, where a key for selecting the pruning channel is to search a channel less contributed to an output; a convolutional channel is selected based on characteristics of intrinsic parameters of the convolutional channel, for example, all channels are sorted based on characteristics of numerical values such an average of parameters, an L1 norm and an L2 norm and pruned according to a sorted result and the proportion or the threshold, and a channel less affecting the number of axles of the vehicle and a detection precision of the wheel is removed, thereby simplifying a structure of the network model; and with $\gamma$ parameters of the BN layers as sparse factors, L1 regularization is performed on the $\gamma$ parameters, such that a part of $\gamma$ parameters approach to 0, and a convolution kernel having a γ parameter less than the threshold is pruned, thereby completing the model training; and step 4: uploading a trained model to a server, where the acquired vehicle image is uploaded by a camera to the server for detection, and the number of axles and a relative wheelbase of the vehicle are detected and compared with a national vehicle load standard GB1589-2016 to obtain a theoretical maximum load of the vehicle; and obtaining a true load of the vehicle through a piezoelectric sensor under a road, and determining whether the vehicle is overloaded by comparing the theoretical maximum load and the true load.

In order to avoid falsely detecting wheels of other vehicles to cause an information error on the number of axles of the vehicle, with the utilization of coordinate information of a wheel bounding box and a vehicle body bounding box and an algorithm, only the number of wheels in the vehicle body bounding box may be calculated during detection on the number of axles of the vehicle.

an automatic online real-time vehicle overload detection may be implemented as follows:

step 1: acquiring the number of axles and the relative wheelbase of the vehicle photographing the vehicle with the camera, and uploading a photographed image to the server for real-time detection; and acquiring the number of tires on the single side of the vehicle to obtain the number of axles of the vehicle, calculating the relative wheelbase with a center coordinate of a bounding box, and comparing the number of axles and the relative wheelbase with the national vehicle load standard GB1589-2016 to obtain the theoretical maximum load of the vehicle; and step 2: evaluating a detection effect evaluating the detection effect to verify the effectiveness of a wheel detection model, where object detection evaluation indexes include a precision and a recall, with a following Eq.:

$$\text{Precision} = \frac{TP}{TP+FP},$$
$$\text{Recall} = \frac{TP}{TP+FN}$$

where, TP represents a true positive, i.e., a detection result is the wheel that is also detected actually; FP represents a false positive, i.e., the detection result is the wheel that is not detected actually; and FN represents a false negative, i.e., the detection result is not the wheel that is detected actually;

introducing an average precision (AP) to evaluate a network performance since individual use of the precision or the recall cannot reflect the network performance accurately, where the AP is calculated as follows:

$$AP = \int_0^1 P(r)dr$$

where, P represents the precision, r represents the recall, and P is a function with the r as a parameter; a result obtained is an area enclosed by a Precision-Recall curve; and a higher AP value indicates a better performance of the trained model for detecting the number of axles and the wheel of the truck.

Compared with the prior art, the present disclosure has the following advantages:

(1) Existing overload detection technologies mostly depend on manual detection and detection of pure hardware devices, whereas the present disclosure can implement the automatic detection.

(2) The present disclosure has desirable real-time detection, can implement no-parking vehicle overload detection on the road, and avoids potential traffic congestions and road traffic accidents.

(3) Through the channel pruning, the present disclosure simplifies the network structure without affecting the detection precision, and has a low hardware requirement, thereby reducing the device cost and being more suitable for application scenarios.

DETAILED DESCRIPTION OF THE EMBODIMENTS

The specific implementation of the present disclosure will be introduced below according to the above descriptions.

The offline part includes two steps:
Step 1: Data Acquisition

Acquire data with a camera on site, photograph multiple scenarios from multiple angles and ensure that each axle number and wheelbase are included in about 5,000 vehicle images.

Step 1.1: Dataset Preparation

Prepare a VOC-format dataset by labeling a wheel and a vehicle body in each photographed image.

Step 2: Construction of a YOLO-V3 Network Framework and Model Training

Figure 1:
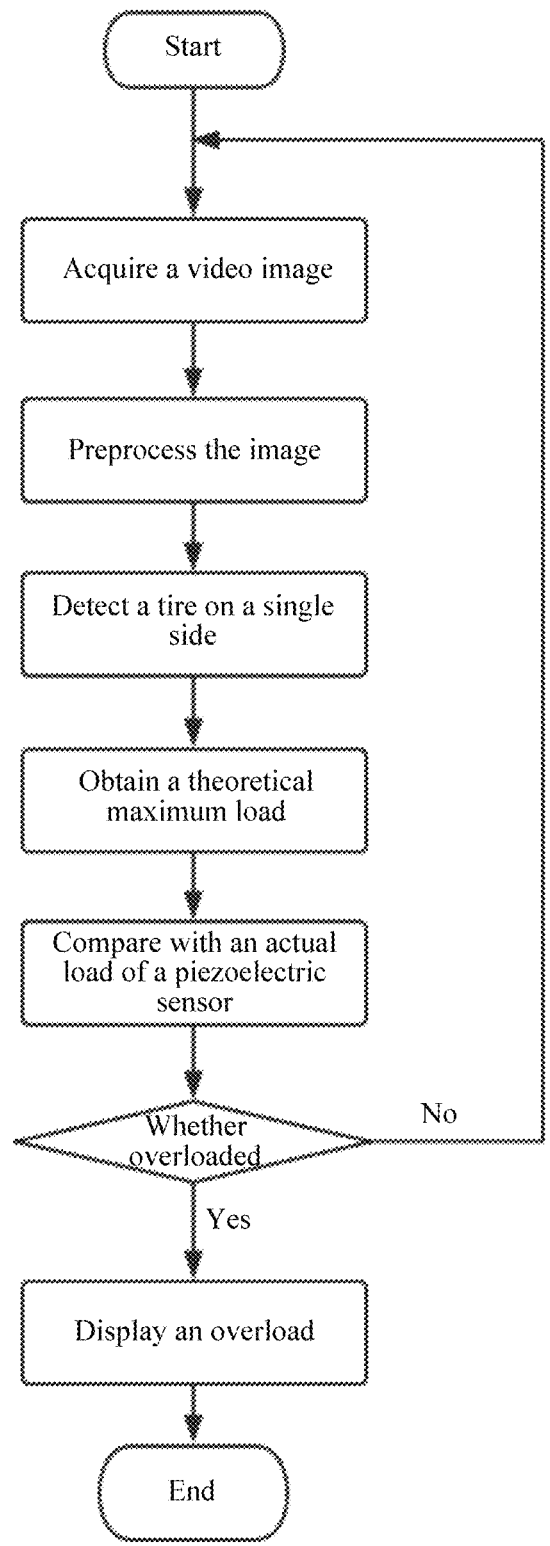
FIG. 1 illustrates a flow chart of a detection algorithm.
Figure 2:
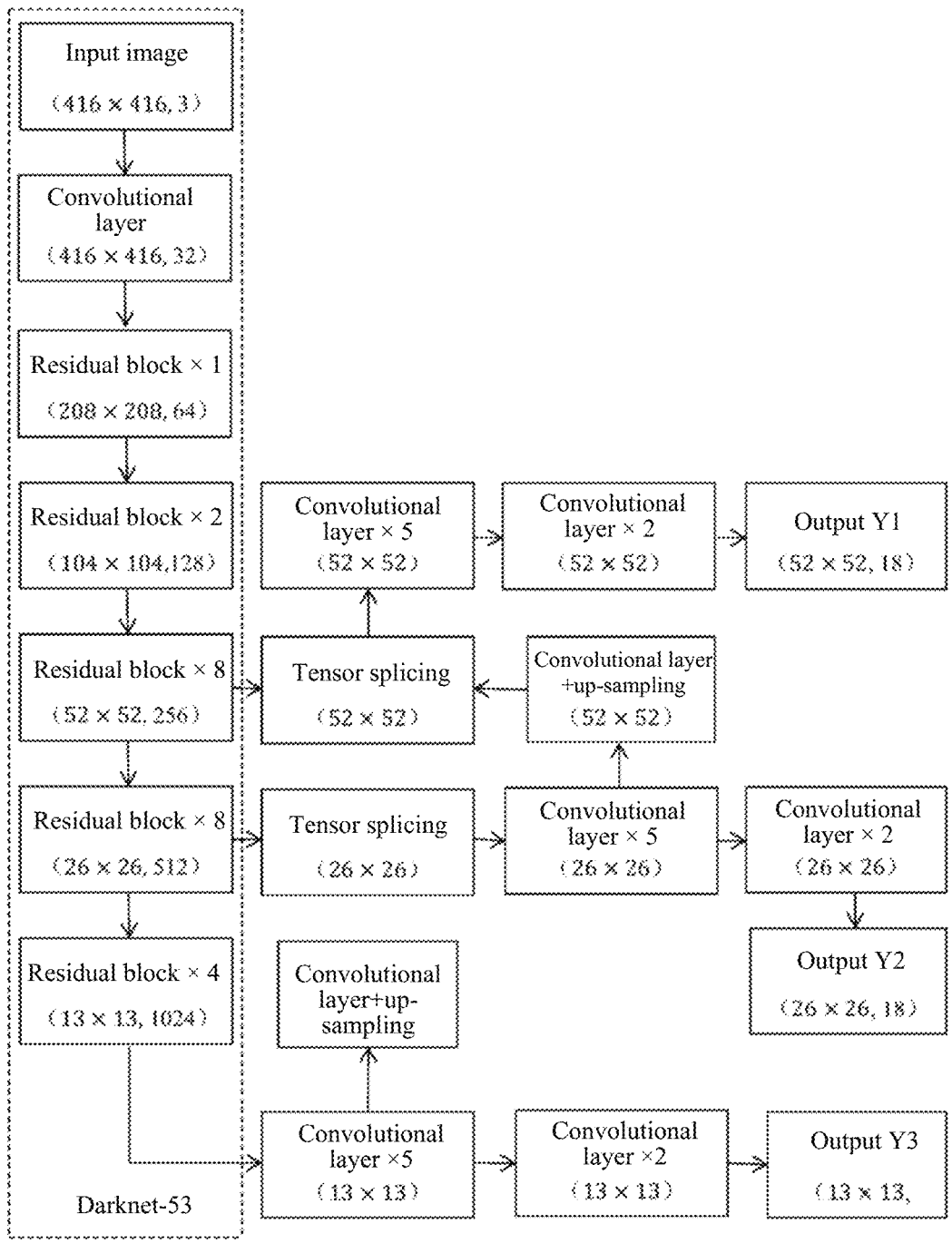
FIG. 2 illustrates a network structure of YOLO-V3.

The YOLO algorithm is to input an image to be detected into the convolutional network for direct classification and bounding box regression. The YOLO-V3 network structure (as shown in FIG. 2) includes two parts, one being a backbone network Darknet-53 for feature extraction and the other being a prediction network for classification and detection box regression.

The computer has a memory of 8 G, and a graphics card of NvidiaGeforeGTX1060. The parallel computation framework and acceleration pool of Nvidia are employed and the version CUDA10+cudnn7.4 is installed.

Figure 3:
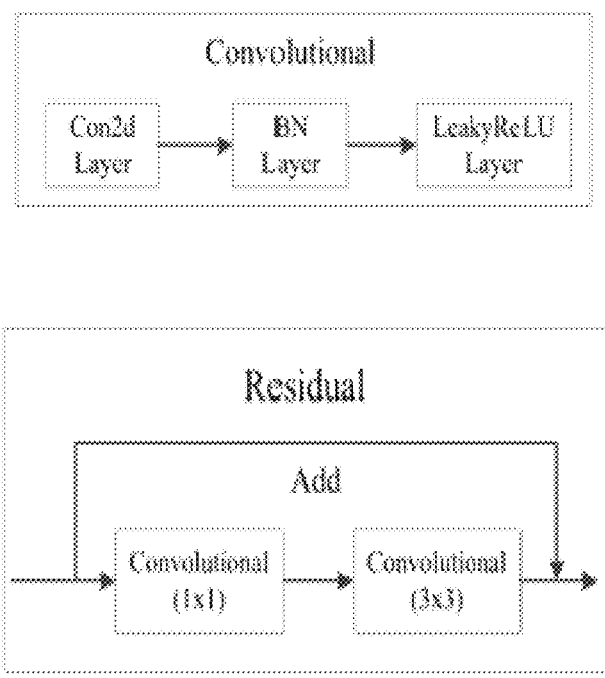
FIG. 3 illustrates a network structure of Darknet-53.

Darknet-53 provides 53 convolutional layers. Because of the residual structure, it can perform deeper construction than the Darknet-19 network. To some extent, the deeper the network, the better the feature extraction capability. Hence, the Darknet-53 model has the higher classification precision than the Darknet-19. The YOLO-V3 abandons the last layer of the Darknet-53 and takes front 52 convolutional layers of the Darknet-53 as the backbone network for feature extraction (as shown in FIG. 3).

In order to implement the real-time detection and maintain the original precision to the greatest extent, channel pruning is performed on the YOLO-V3 to reduce convolutional channels of the YOLO globally. The feature extraction network of the YOLO is then adjusted to reduce a convolutional layer less contributed to the network, thereby obtaining a narrower object detection network.

Figure 4:
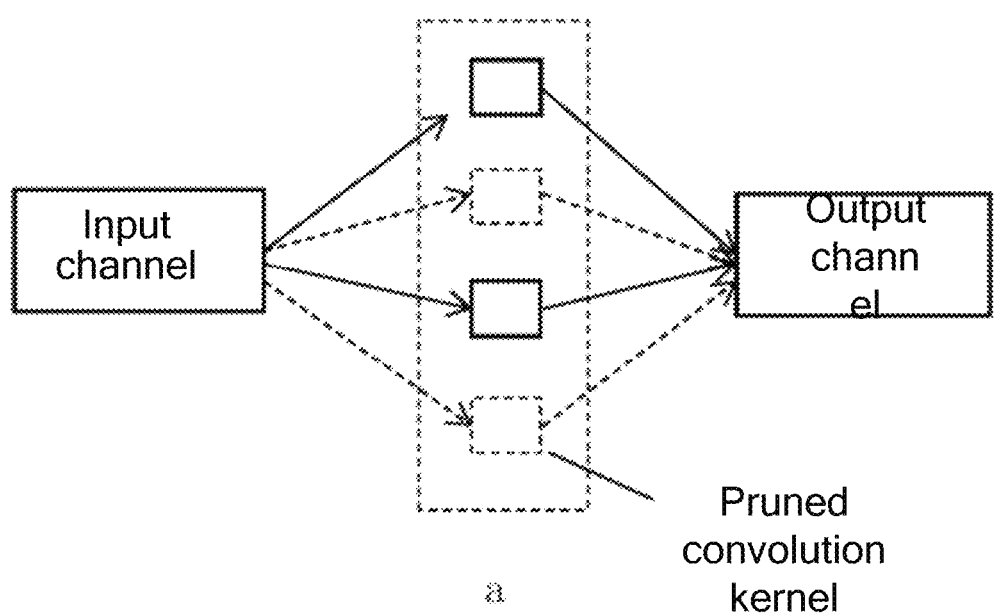
FIG. 4 illustrates a schematic view and a flow chart of channel pruning, where a is the schematic view of the channel pruning, and b is the flowchart of the channel pruning.

The convolution kernel can be deemed as a basic unit of the convolutional layer. After one convolution kernel is pruned, the corresponding output channel is also pruned. When designing the artificial neural network, researchers do not know how many channels are appropriate, and tend to design more channels for the fear of losing effective features of the network. As a result of the blindness, there are many redundant channels in the network. Upon pruning of some redundant convolution kernels, these convolution kernels are not subjected to any calculation during forward reasoning. Meantime, input channels of next convolutional layers corresponding to output of the convolution kernels are also pruned, thereby compressing the network greatly. As the channel less contributed to the network is pruned, the pruning has a little impact on the whole network. FIG. 4 illustrates the schematic view and flow chart of the channel pruning.

With the use of a prior box, the YOLO algorithm provides an anchor box for the convolutional network to predict the object bounding box. It narrows the feature map by increasing the step size of the convolution kernel instead of the use of a pooling layer. In other object detection algorithms, the prior box is manually set based on experience and is not accurate. The YOLO algorithm performs clustering analysis on the manual labeling box of the training sample with a K-means clustering method, and initializes the anchor box with the width and height obtained from the clustering.

Figure 5:
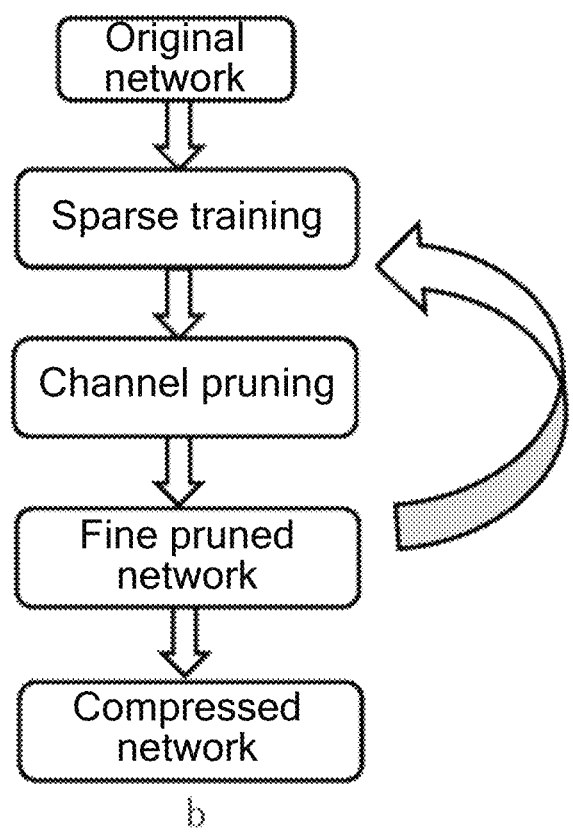
FIG. 5 illustrates a flow chart of a K-means clustering algorithm.

FIG. 5 illustrates a flow chart of the K-means clustering algorithm. The K-means clustering algorithm mainly includes: Step 1: Randomly assign K points as initial centroids. Step 2: Classify each object to be classified to a cluster of the nearest centroid. Step 3: Calculate a centroid of each cluster after classification, update calculated centroids as new centroids of the clustering algorithm, and perform iterative calculation on Step 2 and Step 3 until the centroids no longer change or the number of iterations reaches.

In the K-means algorithm, the distance between the object to be classified and the centroid is indicated by a Euclidean distance, and specifically calculated as follows:

$$dis(X,C) = \sqrt{\Sigma_{i=1}^{n}(X_i - C_i)^2}$$

where, X represents the object to be classified, C represents the centroid, $X_i$ represents an ith property of the object to be classified, $C_i$ represents an ith property of the clustering center, and n represents the number of properties. Distances from each object to be classified to each centroid are compared one by one to obtain m clusters, m being set manually as required. The evaluation index for the classification result of K-means is a sum of distances from all classified objects to centroids thereof. The smaller sum is an indication of a better classification effect.

The YOLO-V3 provides three different scales for output and each scale requires three prior boxes. In this case, nine prior boxes of different sizes are clustered to detect objects of different sizes. The three times of detection correspond to different the receptive ranges. Table 1 illustrates the corresponding relationship between the size of the feature map and the receptive range, where the 32-fold down-sampling is suitable for large objects with the largest receptive range, the 16-fold for middle-sized objects, and the 8-fold for small objects with the smallest receptive range.

The YOLO-V3 detects objects of different sizes with multi-scale prediction. By virtue of the multi-scale prediction, feature information extracted by networks on different layers can be combined to improve the detection effect. Shallow neutral networks more focus on detail information of the images, while the high-level networks can extract more semantic feature information. The output from the deep network is fused with the output from the low-level network, such that the resolution of feature mapping can be increased and the network can make a prediction with more information. Therefore, the object detection effect is effectively improved, and particularly, the detection effect for small objects is obviously improved.

TABLE 1

Corresponding relationship between the size of the feature map and the receptive range

| Feature map | 13 × 13 | 26 × 26 | 52 × 52 |
| --- | --- | --- | --- |
| Receptive range | Large | middle | small |
| Prior box | (116 × 90) | (30 × 61) | (10 × 13) |
| VOC dataset | (156 × 198) | (62 × 45) | (16 × 30) |
|  | (373 × 326) | (59 × 119) | (33 × 23) |

The online part includes two steps:

Step 1: Acquisition for the Number of Axles and a Relative Wheelbase of the Vehicle Detect a photographed image of the camera with the trained model in real time to obtain the number of tires on a single side of the vehicle and the number of axles of the vehicle, calculate the relative wheelbase with a center coordinate of a detection box, and compare the number of axles and the relative wheelbase with a national vehicle load standard to obtain a theoretical maximum load of the vehicle.

Step 2: Evaluation of a Detection Effect

Evaluate the detection effect to verify the effectiveness of a wheel detection model. Object detection evaluation indexes include a precision and a recall, with a following Eq.:

$$\text{Precision} = \frac{TP}{TP + FP},$$

$$\text{Recall} = \frac{TP}{TP + FN}$$

where, TP represents a true positive, i.e., a detection result is the wheel that is also detected actually; FP represents a false positive, i.e., the detection result is the wheel that is not detected actually; and FN represents a false negative, i.e., the detection result is not the wheel that is detected actually; The recall and the precision are two paradoxical measures, and a higher recall may indicate a lower precision.

Introduce an AP to evaluate a network performance since individual use of the precision or the recall cannot reflect the network performance accurately. The AP is calculated as follows:

$$AP = \int_0^1 P(r) dr$$

where, P represents the precision, r represents the recall, and P is a function with the r as a parameter; a result obtained is an area enclosed by a Precision-Recall curve. A higher AP value indicates a better performance of the trained model for detecting the number of axles and the wheel of the truck.

What is claimed is:

1. A real-time vehicle overload detection method based on a convolutional neural network (CNN), comprising:
   step 1: preparing a visual object classes (VOC) dataset, comprising:
   acquiring a plurality of images of each of vehicles with different axle numbers and wheelbases, and labeling each wheel and a vehicle body in each of the plurality of images using a labeling tool as the VOC dataset;
   step 2: configuring a training environment for a YOLO-V3 object detection network model, comprising:
   constructing the YOLO-V3 object detection network model with a darknet deep learning framework in a ubuntu system;
   step 3: training the YOLO-V3 object detection network model, comprising:
   training the YOLO-V3 object detection network model based on the VOC dataset using a YOLO-V3 object detection algorithm, and simplifying the YOLO-V3 object detection network model using a pruning algorithm; and
   step 4: uploading the trained YOLO-V3 object detection network model to a server, acquiring an image of a vehicle in real time by a camera and uploading the image to the server, detecting a number of axles and a relative wheelbase of the vehicle using the trained YOLO-V3 object detection network model, and obtaining a theoretical maximum load of the vehicle by comparing a detection result with a national vehicle load standard GB1589-2016; obtaining a true load of the vehicle through a piezoelectric sensor under a road; and determining whether the vehicle is overloaded by comparing the theoretical maximum load with the true load.

2. The real-time vehicle overload detection method according to claim 1, wherein step 3 comprises:
   step 3.1: pre-training the YOLO-V3 object detection network model with Darknet53, and training the YOLO-V3 object detection network model using the VOC dataset prepared in step 1, wherein the Darknet53 is composed of a series of 1×1 and 3×3 convolutional layers, with a total of 53 layers, and each convolutional layer is followed by a batch normalization (BN) layer and LeakyReLU layer; and
   step 3.2: sparsely training the YOLO-V3 object detection network model, performing channel pruning on the CNN according to a proportion or a set threshold, and performing iterative pruning according to a precision of a pruned network until a detection precision meets a requirement.

3. The real-time vehicle overload detection method according to claim 1, wherein detecting the number of axles of the vehicle comprises, by using coordinate information of a wheel bounding box and a vehicle body bounding box, calculating only a number of wheels in the vehicle body bounding box.

4. The real-time vehicle overload detection method according to claim 2, wherein performing channel pruning on the network CNN according to the proportion or the set threshold, comprises:
   sorting all channels based on characteristics of numerical values comprising an average of the intrinsic parameters, an L1 norm and an L2 norm;
   pruning, according to a sorted result and the proportion or the set threshold, channels less affecting the number of axles of the vehicle and a detection precision of the wheel; and
   using $\gamma$ parameters of the BN layers as sparse factors, performing L1 regularization on the $\gamma$ parameters such that a part of $\gamma$ parameters approach to 0, and pruning convolution kernels having a $\gamma$ parameter less than the set threshold.

5. The real-time vehicle overload detection method according to claim 1, wherein detection effect of the trained YOLO-V3 object detection network model is evaluated based on object detection evaluation indexes comprising a precision and a recall, with equations:

$$\text{Precision} = \frac{TP}{TP+FP},$$

$$\text{Recall} = \frac{TP}{TP+FN}$$

wherein, TP represents a true positive indicating that a detection result of an object is a wheel and the object is the wheel; FP represents a false positive indicating that a detection result of the object is the wheel, but the object is not the wheel; and FN represents a false negative, indicating that a detection result of the object is not the wheel, but the object is the wheel.

6. The real-time vehicle overload detection method according to claim 5, wherein network performance of the trained YOLO-V3 object detection network model is evaluated based on an average precision (AP), wherein the AP is calculated as follows:

$$AP = \int_0^1 P(r)dr$$

wherein, P represents the precision, r represents the recall, and P is a function with r as a parameter; a result obtained is an area enclosed by a Precision-Recall curve; and a higher AP value indicates a better performance of the trained YOLO-V3 object detection network model for detecting the number of axles and the wheels of the vehicle.

* * * * *